3,305,149
METHOD OF AND APPARATUS FOR BREAKING OUT SHEETS OF GLASS
Malcolm Walter Lacey, Tividale, Tipton, England, assignor to Triplex Safety Glass Company Limited, London, England, a corporation of Great Britain
Filed Aug. 19, 1965, Ser. No. 480,961
Claims priority, application Great Britain, Aug. 19, 1964, 33,935/64
5 Claims. (Cl. 225—2)

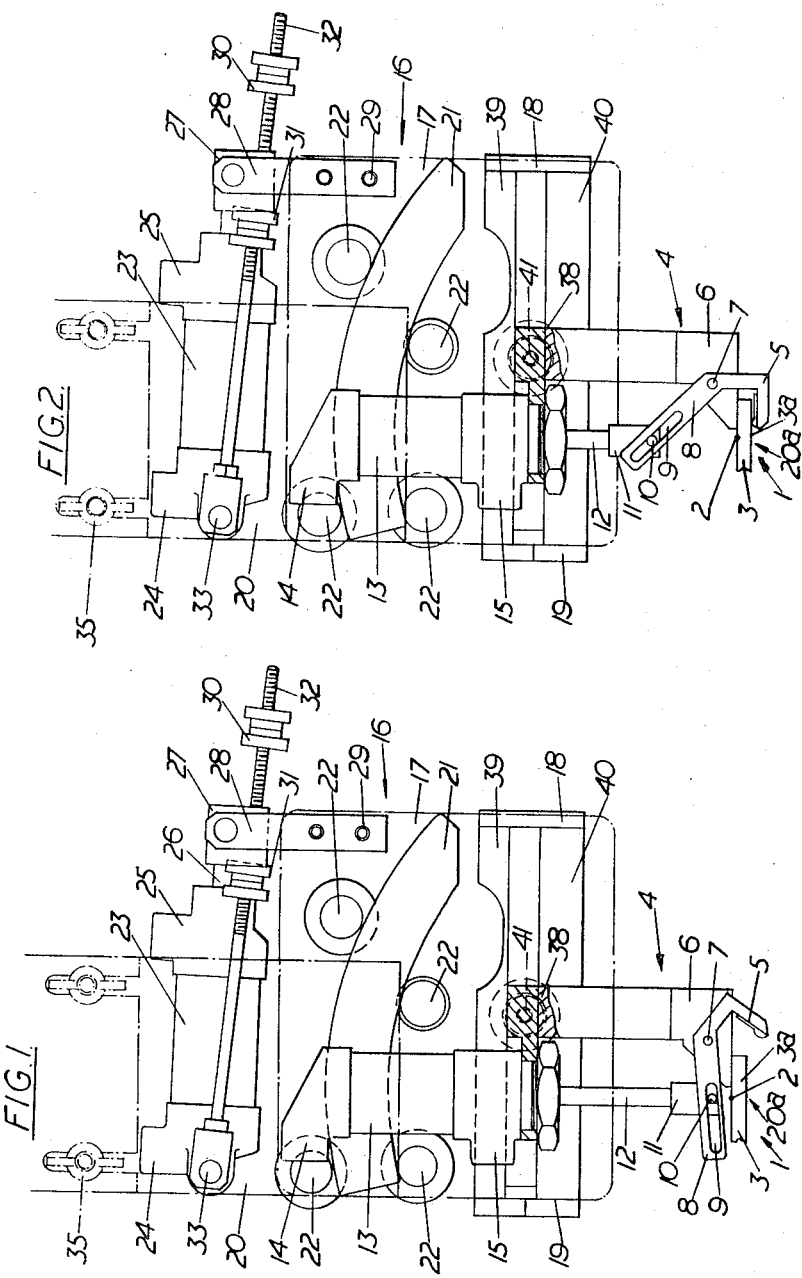

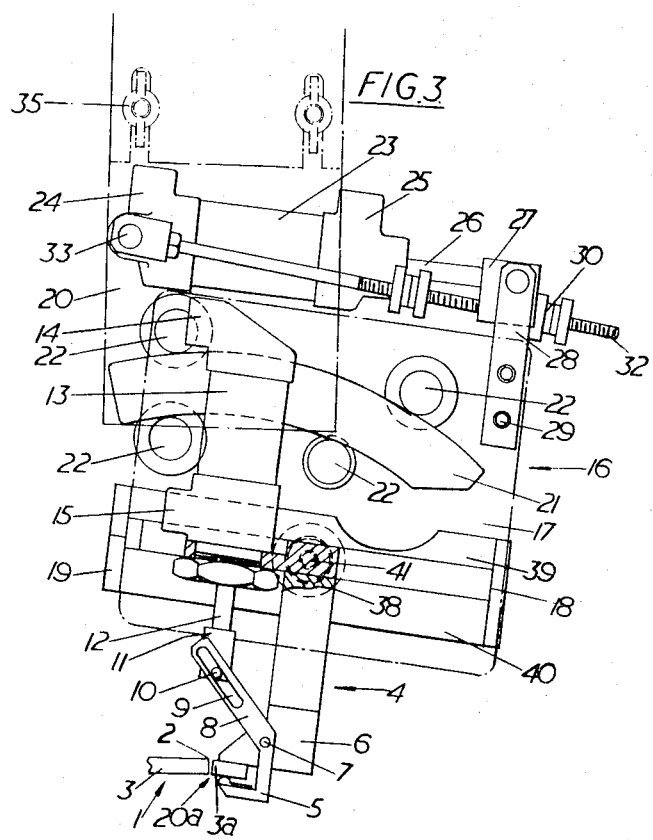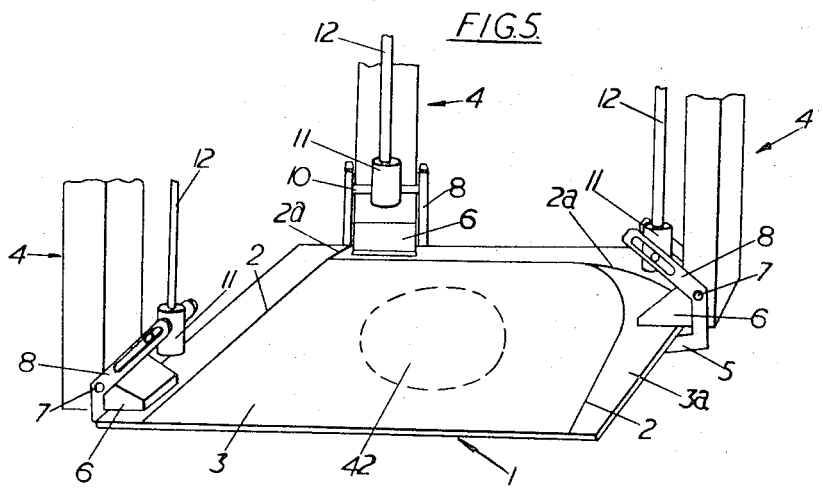

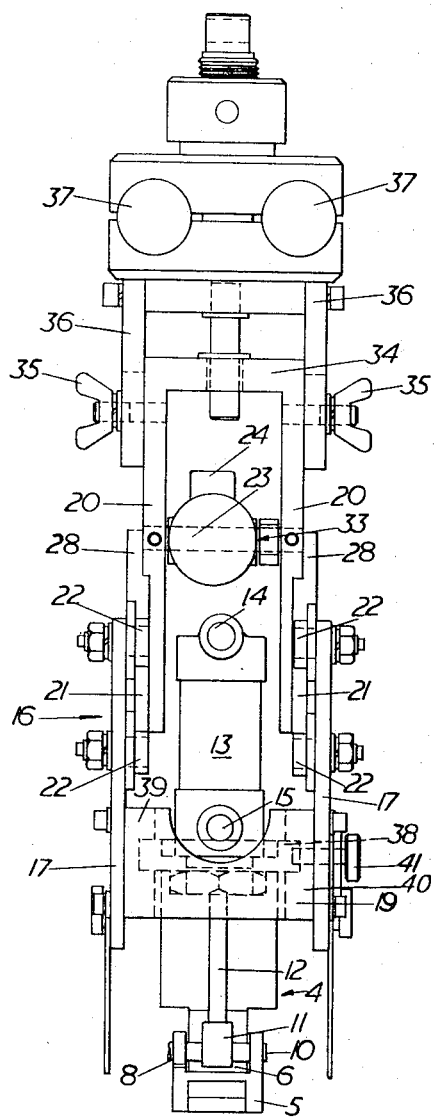

This invention relates to a method of and apparatus for breaking out sheets of glass.

"Breaking out" is a very skilled operation, the operation consisting of freeing the glass within a scoreline on a parent sheet of glass which scoreline delineates the sheet to be produced therefrom from the marginal portions outside it.

In the past it has been customary for the breaking-out of glass sheets from a parent sheet of glass on which the shape of the final product has been delineated by a scoreline to be carried out manually by operators who are skilled in the art of applying the correct forces in the way which produces a clean break with a good and square edge of the sheet, and the occurence of damage to the edge of the glass sheet, for example, "shelling" or "flaking," is avoided.

In the manual breaking-out of glass the workman grips the sheet of scored glass and then progressively fractures the glass by bending it at the scoreline as he works around the marginal portions of the glass. The success of this operation depends upon the skill of the workman in locally bending the glass to produce a clean break of the glass and it will be appreciated that the glass within the scoreline cannot be freed from the marginal portions outside it in one movement and the time taken up in the breaking-out operation is dependent on the time taken by the workman in progressively working around the marginal portions of the glass.

The demand for glass sheets of the shapes to be used as, for example, doorlights in cars and other motor vehicles, has increased to the extent that it is difficult for the quantity requirements of the motor industry to be met when the process involves manual operations, and accordingly attention has been directed over a period to the development of automatic processes for treating glass sheets in the various stages necessary in the production of shaped glass sheets.

The provision of mechanical means for breaking out the glass sheet has been one aspect of this development which has been the subject of prolonged investigation.

In the first instance it was thought that breaking out was an operation which could be performed mechanically without much difficulty, and the main essential was to provide forces acting to ensure that the scoreline was opened. However, when such forces were applied, the quality of the "break" or edge of the shaped glass sheet was found in many cases, and particularly with certain shapes and sizes of glass sheet, to be much below that which was necessary for the final product to be acceptable. In these cases it was found to be essential to provide, in addition to the force or forces which acted to open the scoreline on the parent sheet of glass, auxiliary effects for making the actual break, for example, a thermal treatment of the glass was employed, or a vibratory movement was additionally imposed on the parent sheet of glass.

The necessity of applying such an auxiliary effect in order to break out the glass along the scoreline lead inevitably to extra complications in the method and apparatus for breaking out. Even with the application of the auxiliary treatment the edge obtained on the shaped glass sheet after mechanical breaking out was not always satisfactory.

Accordingly further effort had to be developed to this problem and it has now been found that breaking out may be achieved without having to resort to auxiliary effects and good edges of the broken out sheet may be obtained if the mechanical action of the breaking out is an action which takes place about an axis outside the surface of the glass remote from the scoreline.

According to the present invention therefore there is provided apparatus for breaking out supported sheets of glass scored to delineate the sheet to be produced therefrom comprising a clamp having cooperating jaws between which a marginal portion of the glass may be received and actuating means for actuating the jaws to clamp the glass at the marginal portion, the clamp being arranged for arcuate movement transversely of the plane of the glass and about an axis outside the surface of the glass remote from the scoreline and approximately opposite to the scoreline to open the glass at the scoreline whereby the portion of glass within the scoreline may be freed from the marginal portion outside it.

Further according to the invention there is provided apparatus for breaking out supported sheets of glass scored to delineate the sheet to be produced therefrom, comprising a clamp having co-operating jaws between which a marginal portion of the glass may be received, actuating means for actuating the jaws to clamp the glass sheet at the marginal portion, and a carriage for said clamp, the carriage being arranged for arcuate movement transversely of the plane of the glass and about an axis outside the surface of the glass remote from the scoreline and approximately opposite to the scoreline to open the glass at the scoreline, whereby the portion of glass within the scoreline may be freed from the marginal portion outside it.

Preferably the carriage is arranged for arcuate movement on a support therefor, and conveniently the actuating means for moving the carriage is carried by the support and the actuating means for actuating the jaws is supported by the carriage.

Advantageously the carriage is arranged for arcuate movement between two arcuate guides mounted on the support, on which guides the carriage is located by rollers. The arcuate movement of the carriage may be limited by settable stops on an arm carried by the support, the arm being slidably engaged between the stops in an abutment on the carriage.

In one embodiment of the invention the actuating means for moving the carriage is an air cylinder and piston. Conveniently the actuating means for the jaws is also an air cylinder, operating on one jaw pivoted on the other jaw, which is fixed.

Desirably the position of the clamp is settable with respect to the carriage in order that the apparatus according to the invention when fixed in a desired position may be used to break off from the glass margins of different widths.

The present invention also comprehends a method of breaking out a sheet of glass comprising clamping a supported sheet of glass, scored to delineate the sheet to be produced therefrom, at a marginal portion and causing arcuate movement of the clamped portion transversely of the plane of the glass and about an axis outside the surface of the glass remote from the scoreline to open the scoreline and break out the glass sheet along the scoreline and thereby produce a shaped sheet freed from the marginal portion.

Further according to this aspect the present invention provides a method of breaking out a sheet of glass comprising presenting a supported sheet of glass, scored to delineate the sheet to be produced therefrom, between co-operating jaws of a clamp arranged for arcuate movement transversely of the plane of the glass, clamping a marginal portion of the sheet between the said co-operating jaws and moving the clamp in an arcuate movement about an axis outside the surface of the glass remote from the scoreline and approximately opposite the scoreline to open the scoreline and break out the glass sheet along the scoreline and thereby produce a shaped glass sheet freed from the marginal portion.

Still further according to this aspect, the present invention provides a method of breaking out a sheet of glass comprising presenting a supported sheet of glass, scored to delineate the sheet to be produced therefrom, between the co-operating jaws of a plurality of clamps each arranged for arcuate movement transversely of the plane of the glass, clamping the marginal area of the sheet between the said co-operating jaws, and moving each of the clamps in a similar arcuate movement about an axis outside the surface of the glass remote from the scoreline and approximately opposite the scoreline to open the scoreline and break out the glass sheet progressively along the scoreline by the operation of the clamps in a predetermined sequence.

In most cases the glass sheet to be broken out will be clamped in three or more places and the clamps are caused to follow their respective arcuate movements in very quick succession so that the movements of the clamps are almost simultaneous.

When the desired glass sheet is to be obtained from entirely within a parent sheet of glass and the whole periphery of the parent glass sheet is broken off, it is preferred to have a fly cut on the marginal area of the glass sheet at least near the position at which the first of the clamps is operated. Fly cuts may also be provided at other parts of the marginal area of the glass if desired, and one or more fly cuts may be used even when less than the whole marginal area is to be broken off.

Preferably each clamp is arranged near to one end—the "leading end"—of the part of the scoreline on which the clamp is operating.

In a case where only two edges of the glass sheet are to be broken off, the arcuate movement of the clamps on these two edges may be simultaneous.

The invention also comprehends the product thus produced, viz. a glass sheet completely broken out in the opening operation on the scoreline.

In order that the invention may be clearly understood a preferred embodiment thereof will now be described by way of example with reference to the accompanying drawings in which an installation is shown including three pairs of jaws each positioned near one end of its section of scoreline on a parent sheet defining the sheet to be produced in the breaking out operation.

FIGURE 1 is a side elevation of the apparatus with scored glass presented thereto, FIGURE 2 is a similar view showing the sheet of glass gripped by the jaws of the apparatus, FIGURE 3 shows the apparatus operated to break out the glass within the scoreline to free the sheet from the marginal portions outside the scoreline, FIGURE 4 is an end elevation of the apparatus of FIGURE 1, and FIGURE 5 is a diagrammatic view of a supported sheet of glass being broken out by three of the apparatus of FIGURE 1.

In the drawings the same reference numerals designate the same parts.

Referring to the drawings there is shown apparatus for breaking out a shaped sheet of glass 1, of a shape prescribed by scoreline 2, from the horizontal parent glass sheet 3, including a margin 3a outside the scoreline 2. Fly-cuts 2a (FIGURE 5) are scored on the glass sheet to assist the breaking out operation.

Each apparatus in an installation according to the invention comprises a clamp indicated generally at 4 having co-operating jaws 5 and 6 between which the marginal portion 3a of the glass sheet 1 may be received, the jaw 6 being a relatively fixed jaw and the jaw 5 being movable about a pivot pin 7 carried by the fixed jaw 6. The movable jaw 5 is mounted at the end of two slotted arms 8 each having a longitudinal slot 9 to receive a co-operating pin 10 carried at the lower end 11 of a piston 12, the operation of which causes the movable jaw 5 to pivot about the pivot pin 7 as shown in FIGURE 2.

The upper end of the piston moves in an air cylinder 13 having air inlets 14 and 15. The air cylinder 13 is carried on a carriage shown generally at 16 comprising side walls 17 spaced apart by end walls 18 and 19.

The carriage 16 is mounted on vertical supports 20 and is arranged for arcuate movement thereon, transversely of the plane of the glass sheet 1 about an operating axis 20a outside the undersurface, which is the surface of the parent glass sheet 3 remote from the scoreline 2, and approximately opposite the scoreline. The carriage moves between two arcuate guides 21 mounted on the vertical supports 20 on which guides 21 the carriage 16 is located by two pairs of rollers 22 mounted on each of the side walls 17 of the carriage 16.

The vertical supports 20 carry a second air cylinder 23 having air inlets 24 and 25, the air cylinder 23 being arranged substantially at right angles to the air cylinder 13. The piston 26 of the cylinder 23 is fixed at its upper end to a block 27 pivoted between a pair of vertical supports 28 each of which is bolted by bolts 29 to the inner face of the side walls 17.

The arcuate movement of the carriage 16 along the guides 21 is limited by settable stops 30 and 31 spaced apart on an arm 32 which passes through the block 27, the arm 32 being pivoted at 33 at its other end to one of the vertical supports 20. Arcuate movement of the carriage 16 along the arcuate guides 21 is thus limited by the settable stops 30 and 31, the block 27 abutting the stops 30 and 31 at the ends of its movement. The block 27 and the arm 32 are both pivoted to allow the arcuate movement of the carriage about the axis 20a to occur.

The two vertical supports 20 are joined at their upper ends by transverse member 34 (see FIGURE 4) and the entity as a whole is bolted by wing nuts 35 to an overhead support 36 which is displaceable along guides 37 in order to break out sheets of glass of different sizes.

The clamp 4 is formed with a slipper 38 movable between guides 39 and 40 carried by the side walls 17 of the carriage 16 so that the clamp 4 is settable within the carriage 16 using a screw 41 to lock it in position. By adjusting the clamp 4 margins of different widths may be broken off without the necessity of disturbing the apparatus as a whole.

In use the marginal portions 3a of a parent sheet of glass 3 scored at 2 to delineate the sheet to be produced therefrom and additionally scored at 2a to assist breaking out is presented between the jaws 5 and 6 of three clamps 4 arranged in spaced relationship as shown in FIGURE 5 each clamp being arranged near to the leading end of the part of the scoreline on which the clamp is operating. The parent glass sheet 3 is supported on a circular platen 42 and is secured thereto by suction, for example as described in copending U.S. Patent application Serial No. 480,942 filed August 19, 1965. With the marginal portions 3a of the parent sheet of glass 3 received against the underside of the fixed jaws 6 of the clamps 4 air under pressure is supplied to the inlet 15 of each air cylinder 13 so that the piston 12 is actuated and as the jaw 5 moves clockwise under the marginal portion 3a of the parent glass sheet 3, the glass sheet is clamped at its marginal portions between the jaws 5 and 6.

Air under pressure is then supplied to the inlet 24 of the air cylinder 23 to move the piston 26 so that the block 27 mounted at the end of the piston 26 is forced from its datum position abutting the stop 31 to abut the stop 30 so that the carriage is swung through an arcuate path about the axis 20a, the rollers 22 running along the arcuate guides 21 so that the apparatus assumes the position shown in FIGURE 3.

The operation of the three carriages and their associated clamps is a very rapid sequential operation so that the operation of the three clamps is almost simultaneous, but the clamps are actually operated in a predetermined sequence. For the shaped sheet 1 shown in FIGURE 5 they are conveniently operated from left to right.

The movement of each of the carriages 16 through the arcuate path about the axis 20a opens the scoreline and causes the marginal portions 3a of the parent sheet of glass 3 to be bent outwardly and downwardly away from the area 1 within the scoreline so that the movement of the three clamps opens the scoreline and breaks out the glass sheet progressively along the scoreline 2 and fly-cuts 2a in one direction from one clamp 4 towards each succeeding clamp 4, and thereby produces the shaped sheet of glass 1 freed from the marginal portions 3a on its support 42.

Before the apparatus is reset for operation on a further sheet of glass, the waste portions of marginal glass 3a broken from the parent sheet of glass to obtain the final shaped sheet are released from between the jaws 5 and 6 and fall onto an inclined slope beneath the jaws. The pieces of waste glass slide down the inclined slope and are removed continuously.

The apparatus may then be reset by forcing air under pressure into the inlets 25 and 14 respectively of the air cylinders 23 and 13 so that the apparatus reassumes the position shown in FIGURE 1. A further sheet of glass may then be presented to the apparatus for breaking out.

When the glass is held horizontally, the waste marginal portions 3a of the glass may be released from between the jaws 5 and 6 before the final shaped sheet 1 is removed. The waste marginal portion 3a of the glass will in this case drop clear of the final shaped sheet without damaging it, because of the separating movement which occurs on account of the point of rotation of the clamp being below the lower surface of the glass.

The axis about which rotation of the clamp takes place need only be approximately parallel to the scoreline in the glass sheet, and in fact the axis cannot be parallel to the scoreline when the scoreline is following a curve.

By using an axis of rotation for the jaws which is below the lower surface of the glass, the marginal portion 3a of glass broken from the parent sheet of glass is bent away from the final shaped sheet without flaking the edges of the glass sheet, and the marginal portion is moved away from the final shaped sheet or finished pane of glass without chipping it.

Also, by using an installation as herein described the break along the whole scoreline is immediate in that it is almost instantaneous in the act of opening the scoreline at the locality of each apparatus carrying co-operating jaws, which opening spreads along the scoreline in one direction successively from each pair of jaws. The removal of the marginal area of the parent glass in this operation also permits the breaking out to be effected in a production line in which the shaped sheet is substantially processed (e.g. by edge grinding and polishing) dependent on the intended use of the sheet.

I claim:

1. Apparatus for breaking out supported sheets of glass scored to delineate the shaped sheet to be produced therefrom, the apparatus comprising a clamp having co-operating jaws between which a marginal portion of the glass may be received, actuating means for actuating the jaws to clamp the glass sheet at the marginal portion, a carriage for said clamp, a support for said carriage, guide means interengaging between the support and the carriage for controlling arcuate movement of the carriage transversely of the plane of the glass and about an axis outside the surface of the glass remote from the scoreline and approximately opposite to the scoreline to open the glass at the scoreline, a member carried by the support and having settable stops thereon, the member being slidably engaged in an abutment on said carriage, whereby an arcuate movement of the carriage is limited by said stops.

2. Apparatus according to claim 1, wherein said guide means comprises two arcuate guides mounted on a support for the carriage, and rollers on said carriage to locate the carriage during said arcuate movement.

3. Apparatus according to claim 1 wherein the actuating means for the jaws is an air cylinder operating on one jaw pivoted on another fixed jaw.

4. Apparatus for breaking out from a parent sheet of glass, a glass sheet of a desired shape, the apparatus comprising means for supporting and securing the parent glass sheet in position preparatory to the operation, at least three independent supports, a carriage on each support, a clamp carried by each carriage, each clamp having co-operating jaws between which a marginal portion of the parent sheet of glass may be received, separate actuating means for actuating each of the jaws to clamp the glass sheet at the marginal portion, means for causing arcuate movement of each of the carriages transversely of the plane of the glass and about an axis outside the surface of the glass remote from the scoreline and approximately opposite to the scoreline, an arm carried by each support and having settable stops thereon, each arm being slidably engaged in an abutment on the respective carriage, whereby arcuate movement of the carriage is limited by said stops, and operating means for operating each of he carriages in a predetermined sequence for breaking off marginal portions along separate edges of the parent glass sheet to produce the glass sheet of desired shape.

5. A method of breaking out a sheet of glass comprising the steps of presenting a supported sheet of glass, which is scored within at least two edges to delineate the sheet to be produced therefrom, between the co-operating jaws of a plurality of clamps, there being a clamp for gripping each of the marginal portions to be broken out, each clamp being arranged for arcuate movement transversely of the plane of the glass, clamping the marginal areas of the sheet between the said co-operating jaws and moving the clamps in a predetermined sequence and each in a similar arcuate movement about an axis outside the surface of the glass remote from the scoreline and approximately opposite to the scoreline, to open the scoreline and break out the glass sheet progressively along the scoreline.

References Cited by the Examiner

UNITED STATES PATENTS

| 662,924 | 12/1900 | Dugon | 225—96.5 |
| 1,961,082 | 5/1934 | Shaw | 225—103 |
| 2,111,393 | 3/1938 | Gaskell | 225—103 X |
| 2,174,183 | 9/1939 | Shaw | 225—103 |
| 2,627,640 | 2/1953 | Garnich | 225—93 X |

FOREIGN PATENTS

| 20,167 | 12/1882 | Germany. |

ANDREW R. JUHASZ, *Primary Examiner.*

WILLIAM W. DYER, JR., J. M. MEISTER,
*Assistant Examiners.*